3,067,117
METHOD OF PREPARING A FUEL ELEMENT FOR A NUCLEAR REACTOR

Joseph J. Hauth and Robert J. Anicetti, Richland, Wash., assignors to the United States of America as represented by the United States Atomic Energy Commission
No Drawing. Filed Mar. 15, 1961, Ser. No. 96,053
2 Claims. (Cl. 204—154.2)

This invention relates to a method of compacting a powder in a metal container. In more detail the invention relates to the use of an acoustic field in the compaction of ceramic powders in metal tubes.

The art of compacting a powder within a tube finds obvious application in many fields. One field of importance and the field to which this specification is primarily addressed is that of the preparation of fuel elements for nuclear reactors. Such fuel elements may take the form of elongated metal tubes of relatively small diameter which are filled with a ceramic fuel material such as uranium dioxide, thorium dioxide, or plutonium dioxide, or mixtures thereof.

High-density ceramic fuels are normally desirable because of their increased nuclear reactivity, fission product retention, thermal conductivity, and stability in high-temperature coolants.

It is accordingly an object of the present invention to develop a novel procedure for compacting a powder within a metal container.

It is a more detailed object of the present invention to develop an improved procedure for compacting ceramic materials within a metal tube involving the use of sonic vibrations.

It is a still more detailed object of the present invention to develop a method of preparing a high-density ceramic fuel element for a nuclear reactor.

Compaction of a powder by mechanical vibration and by tamping are standard procedures for many different purposes. We have found that a higher degree of compaction can be attained by subjecting a tube containing a ceramic powder to a high-intensity acoustic field before or while the powder is mechanically compacted. The powder may be compacted by tamping the powder in the tube as by striking the tube against the floor of vibrating the tube containing the powder with a vertical shake. In general, the compaction is obtained by a force applied longitudinally to the tube and mechanically transmitted thereto. By this means a higher density can be obtained than by the application of any one force alone.

A general description of the preparation of a fuel element for a nuclear reactor according to our invention will now be given. Previously sintered or fused compacts or lumps of a ceramic material are crushed and screened to separate desired particle size fractions. Predetermined amounts of the several fractions are weighed, and the mixture is thoroughly blended. The proper amount of the blend is then poured into an elongated metal tube which has a bottom end cap welded in place. An intense sound field is applied transverse to the vertical fuel assembly and moved continuously up and down the assembly. Various frequencies can be used either singly or in combination; these frequencies vary from below the ultrasonic level (8–15 kc.p.s.) to 46 kc.p.s. The contents of the tube are then tamp-packed or are vibratorily compacted. The procedure is repeated until significant compaction is no longer observed. The density of the core is measured by a gamma absorptometer, and the fuel rod is cut to specified length. The second end cap is welded into place, and the rod is prepared for assembly in a fuel element.

A detailed example of one mode in which the invention may be carried out will next be given. 250 grams of arc-fused uranium dioxide having a particle size distribution of 60% −6+10, 15% −65+100, and 25% −200 were compacted by alternately vibrating and tamping the powder into an eight-foot section of .563 inch O.D. x 0.030 inch wall zircalloy-2 tubing. Vibrations were set up by an air jet at supersonic velocity. For these experiments the air jet was produced by a Gulton whistle having a frequency of 8 kc.p.s., which produces a noise level of 135 db at an air pressure of 60–65 p.s.i. The whistle is moved up and down the length of the tube within several inches of the tube. The following procedure was employed with compaction as indicated. Results are given in percent of theoretical crystallographic density obtained.

(1) Loose packed—73%
(2) Whistle for three minutes—73.5%
(3) Two whistles for three minutes—74.5%
(4) Tamped—81.5%
(5) Two whistles for three minutes—81.5%
(6) Tamped—83.5%
(7) Two whistles for three minutes—83.5%
(8) Tamped—84.5%

It is notable that little compaction of the powder is produced by the whistle alone, but that tamping applied after each exposure to the whistle resulted in significant density increases. In particular it should be noted that the ultrasonic treatment must be employed before the mechanically applied compaction for it to be effective. Sonic vibrations as such do not result in substantial compaction but apparently put the material into condition for effective compaction by subsequent tamping. It has also been noted that the sonic vibrations must be applied transversely to the tube, as tests indicated that no advantage was obtained by applying the sonic vibrations from the top.

Using tamp-packing alone the same powder could only be compacted to 80% of the theoretical.

Although it is anticipated that the invention will find particular use in connection with the compaction of powders in elongated tubes of relatively small diameter, it is also useful for shorter thick-wall tubes and in some cases may be the instrumentality for obtaining compaction which cannot be readily obtained by other methods of cold compaction.

Examples illustrating the invention in connection with mechanical vibratory compaction will next be given. In these tests two different vibrators were used which are designated below as the "electromechanical vibrator" and the "electrodynamic shaker." The electromechanical vibrator has a fixed frequency of 60 cycles per second and an amplitude of the order of 0.01″ to 0.02″. The electrodynamic shaker is a variable frequency (5 to 3000 cycles per second), 5,000 pound thrust machine. Both of these machines give a vertical shake to the object being shaken. The ultrasonic generators were Gulton whistles designated as follows: Mono Whistle V–1—a single whistle, frequency range 7 to 15 kilocycles per second, intensity 135 decibels, power output 60 acoustic watts. Mono Whistle V–3—same as Mono Whistle V–1 but frequency range of 32 to 36 kilocycles. Multi Whistle V–1—set of 12 whistles, power output 600 acoustic watts, frequency range 7 to 15 kilocycles.

The material used was fused $UO_2$ powder having a particle size distribution of 65% minus 6 plus 10 mesh,
15% minus 35 plus 65,
20% minus 200.

A known weight of powder was poured into a zircalloy tube which is .505″ I.D. and 50″ long and has a 30 mil.

wall thickness. Density was determined by measuring the height of the powder in the tube. The tube was then subjected to the treatment tabulated below and the density was again determined by measuring the height of the powder. Where the term "low frequency mechanical vibration" is used the electromechanical vibrator was employed. Where the term "variable frequency vibration" is used the electrodynamic shaker was employed to vibrate the tube over the whole range of frequencies from much above the resonant frequency of the tube to below the resonant frequency as taught by Patent No. 3,042,594, issued July 3, 1962, to Joseph J. Hauth. The "restraint" of runs 9 and 10 was a rod loosely fitting in the tube and resting on the powder. No restraint was used in the other experiments.

Summary of results: All results are given as percent of theoretical density.

(1) $UO_2$ density as loaded—66%
(2) Air-jet generator only for five minutes
   A. Mono Whistle V-1—66.5%
   B. Mono Whistle V-3—68.4%
   C. Multi Whistle V-1—67.0%
(3) Air-jet generator for five minutes and simultaneous low frequency mechanical vibration
   A. Mono Whistle V-1—78.6%
   B. Mono Whistle V-3—78.1%
   C. Multi Whistle V-1—79.6%
(4) Low frequency mechanical vibration alone—77.5%
(5) Air-jet generator for five minutes after low frequency mechanical vibration
   A. Mono Whistle V-1—77.5%
   B. Multi Whistle V-1—77.5%
(6) Low frequency vibration followed by air-jet generator for five minutes followed by low frequency vibration
   A. Mono Whistle V-1—78.9%
   B. Multi Whistle V-1—78.9%
(7) Variable frequency vibration alone—no restraint—83.2%
(8) Variable frequency vibration followed by air-jet generator for five minutes (Mono Whistle V-3) followed by variable frequency vibration—no restraint—86.8%
(9) #8 followed by variable frequency vibration with floating restraint—88.9%
(10) Variable frequency vibration alone—with floating restraint—89.0%

It is evident from the above tests that no improvement in density is obtained when sound blast is applied after mechanical vibration but that an improvement is generally obtained when the sound field is applied first or simultaneously with the mechanical vibration. It is noted also that test 8 shows an improvement over test 7 although test 10 does not show an appreciable improvement over test 9. Thus the process of this invention improves the compaction attained by variable frequency vibration when no restraint is possible. This situation prevails in some cases where the powder is recycled fuel.

It will be understood that this invention is not to be limited to the details given herein but that it may be modified within the scope of the appended claims.

What is claimed is:

1. A method of preparing a fuel element for a nuclear reactor comprising crushing and screening fused uranium dioxide into a plurality of size range fractions, blending selected size range fractions, introducing said blend into a tube composed predominantly of zirconium to which a lower end cap has been welded, moving a whistle generating high-frequency sonic vibrations along the length of the tube for three minutes, moving two such whistles along the length of the tube for three minutes, manually tamping the powder in the tube, and repeating the application of high-frequency sonic vibrations and tamping several times, and then cutting the tube to the desired length and welding a top end cap thereto.

2. A method of preparing a fuel element for a nuclear reactor comprising crushing and screening fused uranium dioxide into a plurality of size range fractions, blending selected size range fractions, introducing said blend into a tube composed predominantly of zirconium to which a lower end cap has been welded, vibrating the tube over the whole range of frequencies from much above the resonant frequency of the tube to below the resonant frequency without restraint on the powder, moving a whistle generating high-frequency sonic vibrations along the length of the tube for five minutes, vibrating the tube over the whole range of frequencies from much above the resonant frequency of the tube to below the resonant frequency without restraint on the powder, and then cutting the tube to the desired length and welding a top end cap thereto.

References Cited in the file of this patent

UNITED STATES PATENTS

| | | |
|---|---|---|
| 2,725,288 | Dodds et al. | Nov. 29, 1955 |
| 2,907,705 | Blainey | Oct. 6, 1959 |
| 2,920,430 | Skinker | Jan. 12, 1960 |
| 2,941,933 | Roake et al. | June 21, 1960 |
| 2,983,660 | Loeb et al. | May 9, 1961 |

OTHER REFERENCES

AEC Report NAA-SR-4155, October 1959, page 3 relied upon.

WADC-TR-53-193, part II, April 1954.